Oct. 25, 1949.   T. L. FAWICK   2,486,269
POWER TAKE-OFF GEARING
Filed Sept. 8, 1945
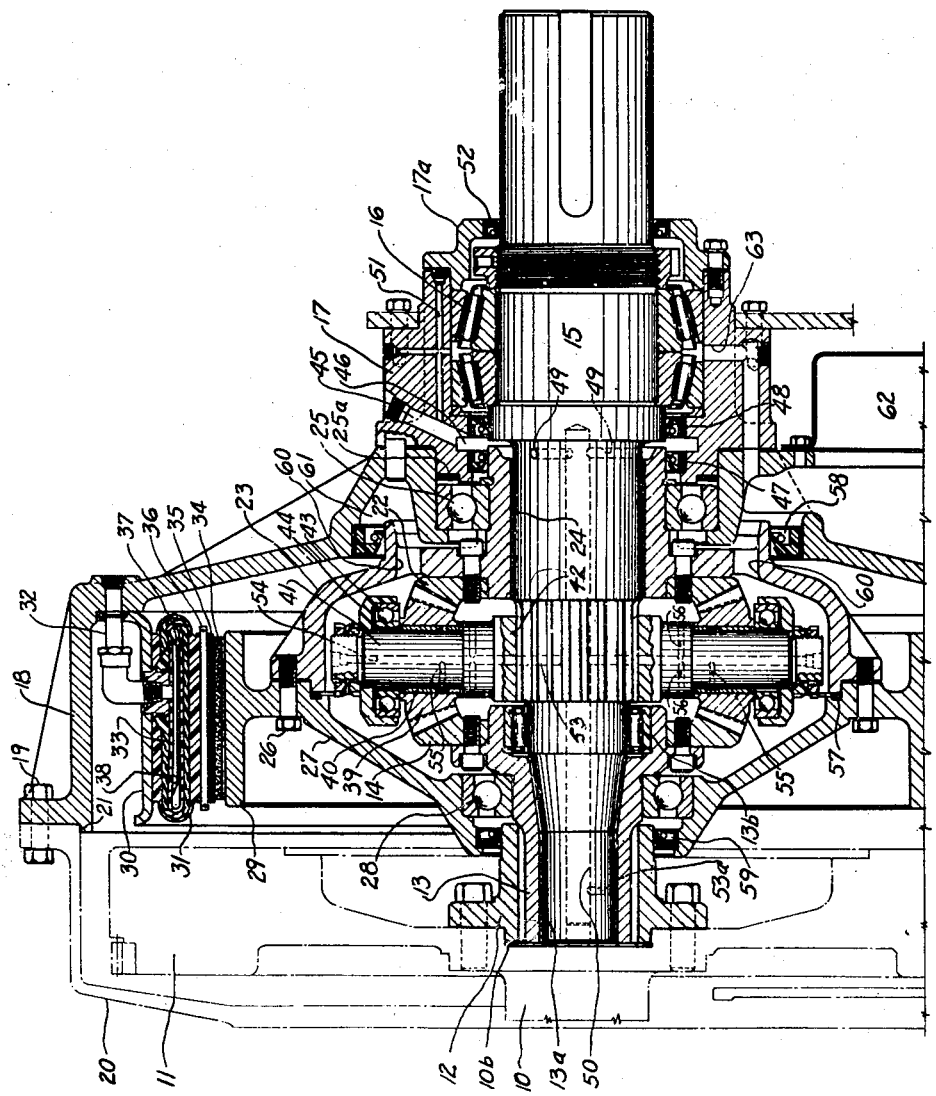
INVENTOR
THOMAS L. FAWICK
BY
Willard D. Eakin
ATTORNEY Patented Oct. 25, 1949

2,486,269

UNITED STATES PATENT OFFICE 2,486,269

POWER TAKE-OFF GEARING

Thomas L. Fawick, Akron, Ohio

Application September 8, 1945, Serial No. 615,181

2 Claims. (Cl. 74—777)

1

This invention relates to gearing suitable for use as a power take-off for tractors, for example.

Its chief objects are to provide a compact gearing having a desirable speed-reduction ratio; to provide, for rendering the gearing effective, a control device not required to rotate and yet, preferably, adapted to cushion the torque; to provide, for such a gearing, a simple and effective lubricating system with provision against oil reaching frictional control parts that would be harmfully affected by its contact, even though the control device as well as the gearing proper are contained in the same compact housing; and to provide convenience and economy of assembly, disassembly and repair.

The single figure of the accompanying drawing is a fragmentary, vertical, axial section of a power take-off assembly embodying my invention in its preferred form for forward drive with two to one speed reduction.

Referring to the drawing, the power take-off shaft 10 of a motor has secured thereon a flywheel 11 and an extension hub member 12 which is splined to a short hollow shaft 13. On the shaft 13 is secured a bevel gear 14 which is one of the coaxial gears of a differential gearing.

A driven shaft 15 is journaled in the short, hollow shaft 13, by means of a bronze bushing 13a and a roller bearing 13b, and at a distance from the latter, by means of a radial-and-thrust bearing 16, is journaled in a stationary housing which comprises members 17 and 18, of which the latter is secured by bolts such as the bolt 19 to the crank-case or housing 20 of the motor, the gear casing member 18 being provided with a centering shoulder 21.

The driven shaft 15 projects from the gear-housing and is adapted to have a belt-pulley or the like (not shown) mounted upon its projecting portion.

The construction as thus far described is such that the power take-off mechanism and its housing can be handled as a unit for mounting and dismounting it with relation to the motor housing, the splines of the shaft 13 mating and unmating with those of the hub member 12 as the centering shoulder 21 of the gear-housing member 18 is moved into or out of the motor housing 20.

Spaced from and facing the bevel gear 14, the other coaxial gear 22 of the differential gearing is secured upon the inside hub projection of a bell-shaped gear-housing member 23 which has the driven shaft 15 journaled within it, with a bronze bearing 24 interposed, and is itself jour-

2 naled within the housing member 18 by means of a radial-and-thrust bearing 25, one of the races of which is provided with a deformable cushioning ring 25a to permit expansion and contraction of the structure of which the member 23 is a part.

Secured to the outer periphery of the bell-shaped member 23 by bolts such as the bolt 26 is another bell-shaped member 27 which is journaled, by a radial-and-thrust bearing 28, upon the shaft 13 of the gear 14, and beyond the outer periphery of the member 23, is shaped to provide a brake drum 29, adapted to be frictionally engaged and held against rotation by a fluid-actuated brake mounted within the housing member 18.

This brake embodies the invention of my U. S. Patent No. 2,237,864. The present embodiment comprises an annular metal base member 30 bolted at one of its annular margins to an inner face of the housing member 18 and having vulcanized to its inner face an annular bag 31 adapted to be inwardly distended, toward the axis of rotation, by pressure fluid conducted into it through a conduit 32.

The bag is composed of rubber or the like reinforced with cords 33, its construction being substantially that of a pneumatic tire except that the bag is of pronouncedly flat cross-sectional form, so that with a given fluid pressure per square inch it will provide a strong total brake-engaging pressure.

Mounted upon the inner periphery of the bag is a circumferential set of wear shoes, such as the shoe 34, adapted to engage the drum 29, each shoe being secured to a base-plate 35 of U-shape which straddles the tread portion of the bag and is anchored thereto by pins, such as the pin 36, extending through the rubber or the like and through the side flanges of the base plate.

The bag preferably has oppositely bulged, freely-flexing and torque sustaining-and-cushioning side walls and for giving them free action, without excessively localized flexure, but with small internal fluid-capacity for the bag, for quick engagement and disengagement of the brake, the chamber in the bag is given U-shape in cross-section by the presence of a filler rib 37 which extends throughout the great-circle of the bag except that at the position of the entrance of the conduit 32 into the bag the rib is transversely grooved, as shown at 38, for free lateral flow of the incoming or outgoing fluid.

Mounted between and meshes with the coaxial gears 14 and 22 of the differential gearing is a circumferentially spaced set of bevel gears such as the gear 39, each of them being journaled, by means of a bronze bearing 40, upon a radial arm 41 projecting from a spider hub 42 which is splined upon the driven shaft 15. Each of the gears 39 has a radial-and-thrust bearing 43 interposed between it and a bearing cup 44 secured on the outer end of the arm 41, so that excessive frictional resistance does not result from outward pressure of the gears 39 resulting from centrifugal force or any other cause.

The construction as thus far described is such that with the fly-wheel 11 rotating, full engagement of the brake with the drum 39 causes the shaft 15 to be driven in the same direction as the motor-shaft 10 and gear 14 but at only half of their angular speed. Release of the brake permits the drum 29 and its gear 22 to rotate freely in the direction opposite to that of the shaft 10 and gear 14, so that the spider 42 and shaft 15 are not compelled to rotate.

The oil-distributing system comprises an inlet hole 45 leading, from a coupling socket in the outer face of the housing member 17, to an annular space 46 between the shaft 15 and the hub of the member 23, to which the housing member 17 is sealed by respective oil seals 47, 48 so that oil can be forced under pressure to lubricate the bearing 24 and also into radial holes 49, 49 in the shaft 15 which lead to an axial hole 50 in said shaft.

A branch hole 51 leads from the inlet hole 45 to the bearing 16 and beyond that bearing an oil seal 52 is interposed between the driven shaft 15 and an end cap 17a of the housing structure.

From the axial hole 50 in the driven shaft 15 radial holes such as the hole 53 lead to the splines of the shaft 15 and of the differential spider and each spider arm is formed with a radial hole 54 in extension of one of the holes 53, with a transverse hole 55 leading to the bearing 40, and with a pair of transverse holes 56, 56 leading to the outer face of the spider-arm positions spaced inwardly from the inner ends of the spider's gears 39, so that oil will be supplied to the teeth of all of the gears and to the bearings 43, 28 and 13b.

The gear-housing members 23 and 27 are sealed to each other by a gasket 57 and respectively they are sealed to the housing member 18 by an oil-seal 58 and to the fly-wheel's extension hub 12 by an oil-seal 59, so that oil can not reach the friction face of the drum 29 or the distensible bag 31, permissibly of rubber, which coacts with it.

The shaft 10 is sealed to its extension hub 12 by a gasket 10b so that oil forced through radial hole 53a in the shaft 15 and through the bearing 13a can flow only to the space within the gear case.

The gear-case member 23 is formed with a circumferentially spaced set of holes, such as the hole 60, leading to an annular space 61 between it and the housing member 18, this annular space being, at the lower part of the assembly, in communication with an oil sump 62, from which the oil can be drawn by the pressure pump for re-circulation of the oil. Also a passage 63 leads from the lower part of the bearing 16 to the sump.

Alternatively, the gear case comprising the members 23, 27 can be kept completely filled with oil, or a less quantity of oil can be maintained therein, with each of the bearings 43 dipping into oil in the lower part of the gear-case at each revolution of the spider, as the spider is always rotating when the gearing is under load.

Any or all of the oil-seal and gasket members can comprise any one of the many well known oil-resistant rubber substitutes such as polymerized vinyl chloride or di-chlorbutadiene, and the same applies also to the distensible bag, but the bag preferably is formed primarily of natural rubber, for durability at elevated temperatures, even though it is subject to deterioration by oils contacting it.

In the appended claim the words "fulcrum gear" are used as applying to the gear 22 or its equivalent. Whenever the gear 22 is functioning, to effect drive of the shaft 15, it constitutes a non-rotating fulcrum for the action of each of the gears 39 in the latter's reception of force from the gear 14 and transmission of it to the arm 41.

The construction as described is subject to modification without sacrifice of all of the advantages set out in the above statement of objects and without departure from the scope of the appended claims.

I claim:

1. A power transmitting mechanism comprising a stationary outer housing, two coaxial bevel gears facing each other within said housing, coaxial driving and driven shafts having parts of them within, and journaled with relation to, said outer housing, one of said shafts having one of the coaxial gears secured thereon and the other having a radial arm extending between the coaxial gears, a bevel gear journaled on said arm and meshed with the coaxial gears, a rotatable inner housing secured to the other one of the coaxial gears and surrounding all of said gears, oil-sealing means interposed operatively between the said inner housing and the respective shafts, and friction-brake means within the outer housing and surrounding said inner housing substantially at the position of the gears axially of the assembly, for stopping and releasing said inner housing, the inner housing, oil-sealing means and shafts defining a substantially closed chamber containing the gears.

2. A mechanism as defined in claim 1 including stationary oil-drainage means in communication with the space within the inner housing but, because of the oil-sealing means defined, not in communication with the space surrounding the friction-brake means.

THOMAS L. FAWICK.

REFERENCES CITED

The following references are of record in the file of this patent:

UNITED STATES PATENTS

| Number | Name | Date |
|---|---|---|
| 1,963,308 | Molinelli | June 19, 1934 |
| 2,055,325 | Woolson | Sept. 22, 1936 |
| 2,080,937 | Starr | May 18, 1937 |
| 2,104,658 | Langdon | Jan. 4, 1938 |
| 2,158,054 | Bradbury | May 16, 1939 |
| 2,341,989 | Hoistmann | Feb. 15, 1944 |
| 2,371,828 | Kuhns | Mar. 20, 1945 |
| 2,374,829 | Nardone | May 1, 1945 |
| 2,388,955 | Couse | Nov. 13, 1945 |

FOREIGN PATENTS

| Number | Country | Date |
|---|---|---|
| 718,202 | France | Jan. 21, 1932 |
| 770,378 | France | Sept. 13, 1934 |